US012341822B2

(12) United States Patent
Shue et al.

(10) Patent No.: US 12,341,822 B2
(45) Date of Patent: Jun. 24, 2025

(54) METHOD AND APPARATUS FOR PROVIDING ISOLATED ASSET ACCESS IN A LAYERED SECURITY SYSTEM

(71) Applicant: Worcester Polytechnic Institute, Worcester, MA (US)

(72) Inventors: Craig Shue, Worcester, MA (US); Lane Harrison, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 363 days.

(21) Appl. No.: 17/946,595

(22) Filed: Sep. 16, 2022

(65) Prior Publication Data

US 2023/0086957 A1  Mar. 23, 2023

Related U.S. Application Data

(60) Provisional application No. 63/245,524, filed on Sep. 17, 2021.

(51) Int. Cl.
*H04L 9/40* (2022.01)
*G06F 21/53* (2013.01)

(52) U.S. Cl.
CPC ........... *H04L 63/20* (2013.01); *G06F 21/53* (2013.01)

(58) Field of Classification Search
CPC .................................. H04L 63/20; G06F 21/53
USPC ........................................................... 726/1
See application file for complete search history.

(56) References Cited

U.S. PATENT DOCUMENTS

| | | | | |
|---|---|---|---|---|
| 8,010,992 B1* | 8/2011 | Chang | ............... | H04L 67/567 726/1 |
| 10,771,337 B1* | 9/2020 | Das | ............... | H04L 63/102 |
| 11,349,870 B2* | 5/2022 | White | ............... | H04W 4/70 |
| 11,652,848 B1* | 5/2023 | Talur | ............... | H04L 63/0236 726/1 |
| 2008/0256592 A1* | 10/2008 | Schnell | ............... | G06F 21/1012 726/1 |
| 2013/0247113 A1* | 9/2013 | Zheng | ............... | H04N 21/42209 725/61 |
| 2014/0068784 A1* | 3/2014 | Merkow | ............... | H04L 41/0894 726/26 |
| 2014/0317677 A1* | 10/2014 | Vaidya | ............... | H04L 63/20 726/1 |

(Continued)

OTHER PUBLICATIONS

International Search Report Dated Feb. 9, 2023 From Corresponding PCT Application No. PCT/US22/043825.

*Primary Examiner* — Badri Narayanan Champakesan
(74) *Attorney, Agent, or Firm* — Duquette Law Group

(57) ABSTRACT

Embodiments of the innovation relate to a server device, comprising a controller having a memory and a processor, the controller configured to establish a first secure environment with a client device, the first secure environment having an associated server asset policy; provide the asset to the client device via the first secure environment; receive a request from the client device, via the first secure environment, to utilize the asset with a user-selected application according to a user-selected asset policy; establish a second secure environment with the client device, the second secure environment having the user-selected application and the associated user-selected asset policy and the second secure environment isolated from the first secure environment; and provide the asset to the client device via the second secure environment.

20 Claims, 4 Drawing Sheets

(56) References Cited

U.S. PATENT DOCUMENTS

| | | | |
|---|---|---|---|
| 2016/0044040 A1* | 2/2016 | Caffary, Jr. | H04L 9/30 |
| | | | 726/4 |
| 2016/0196432 A1* | 7/2016 | Main | H04W 12/08 |
| | | | 726/1 |
| 2019/0238592 A1* | 8/2019 | Qureshi | G06F 21/53 |
| 2019/0342335 A1* | 11/2019 | Ni | H04L 41/0806 |
| 2021/0234860 A1* | 7/2021 | Bansal | H04W 12/37 |
| 2021/0234898 A1* | 7/2021 | Desai | H04L 63/104 |

* cited by examiner

METHOD AND APPARATUS FOR PROVIDING ISOLATED ASSET ACCESS IN A LAYERED SECURITY SYSTEM

RELATED APPLICATIONS

This patent application claims the benefit of U.S. Provisional Application No. 63/245,524 filed on Sep. 17, 2021, entitled "Usable Execution Isolation in Layered Security Systems," the contents and teachings of which are hereby incorporated by reference in their entirety.

BACKGROUND

Conventional layered security systems have been designed to constrain user access at the application or process level. As an example, the Qubes operating system isolates virtual machines (VMs) to create explicit boundaries and trust levels relative to applications or processes. In these environments, if a tool or environment is compromised, only the assets within that trust boundary are at risk. As a result, deployers can constrain levels with sensitive assets while reducing restrictions for environments with less sensitive assets.

SUMMARY

Conventional layered security systems suffer from a variety of deficiencies. For example, conventional mechanisms can focus solely on the security of networked computer devices. As such, when an information technology (IT) department implements network security measures, such measures can unduly restrict the operation of the computer devices, thereby reducing the flexibility of the end-user. Other security mechanisms, such as Qubes OS, can be relatively difficult to use, thereby limiting the number of adopters. Additionally, while Qubes OS can divide a computer system into many separate environments, such as virtual machines, Qubes OS does not provide for secure use of assets between two or more computer devices. As such, organizations utilizing these types of layered security systems can remain vulnerable to attack.

By contrast to conventional layered security systems, embodiments of the innovation relate to a method and apparatus for providing isolated asset access in a layered security system. In one arrangement, a server device is configured to allow an asset owner to specify security restrictions for a particular asset and to establish a first secure environment, such as a first virtual machine, with a client device for the restricted use of those assets. In response to receiving a client request for use of those assets with reduced security restrictions with a particular application, the server device can instantiate a second secure environment, such as a second virtual machine, with the client device. The server device is configured to define the security restrictions for the second secure environment based upon the reduced security restrictions requested by the client device and to provide the assets and requested application to the client device through the second secure environment. In this arrangement, the client device can manipulate the assets using the application within the second security environment, separate from the assets stored by the server device.

This approach allows an organization to better secure their computer systems by dividing activities into various security levels and applying security controls to each level independently. The approach also provides organizations with the ability to lock-down computing environments that deal with sensitive assets yet allow freedom and flexibility in environments with non-sensitive assets (e.g., normal web browsing). This can mitigate attacks, such as ransomware or data leaks, which cost organizations billions annually.

Embodiments of the innovation relate to, in a server device, a method to provide isolated access to an asset. The method comprises establishing a first secure environment with a client device, the first secure environment having an associated server asset policy; providing the asset to the client device via the first secure environment; receiving a request from the client device, via the first secure environment, to utilize the asset with a user-selected application according to a user-selected asset policy; establishing a second secure environment with the client device, the second secure environment having the user-selected application and the associated user-selected asset policy and the second secure environment isolated from the first secure environment; and providing the asset to the client device via the second secure environment.

Embodiments of the innovation relate to a server device, comprising a controller having a memory and a processor, the controller configured to establish a first secure environment with a client device, the first secure environment having an associated server asset policy; provide the asset to the client device via the first secure environment; receive a request from the client device, via the first secure environment, to utilize the asset with a user-selected application according to a user-selected asset policy; establish a second secure environment with the client device, the second secure environment having the user-selected application and the associated user-selected asset policy and the second secure environment isolated from the first secure environment; and provide the asset to the client device via the second secure environment.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the innovation relate to a method and apparatus for providing isolated asset access in a layered security system. In one arrangement, a server device is configured to allow an asset owner to specify security restrictions for a particular asset and to establish a first secure environment, such as a first virtual machine, with a client device for the restricted use of those assets. In response to receiving a client request for use of those assets with reduced security restrictions with a particular application, the server device can instantiate a second secure environment, such as a second virtual machine, with the client device. The server device is configured to define the security restrictions for the second secure environment based upon the reduced security restrictions requested by the client device and to provide the assets and requested application to the client device through the second secure environment. In this arrangement, the client device can manipulate the assets using the application within the second security environment, separate from the assets stored by the server device.

Figure 1:
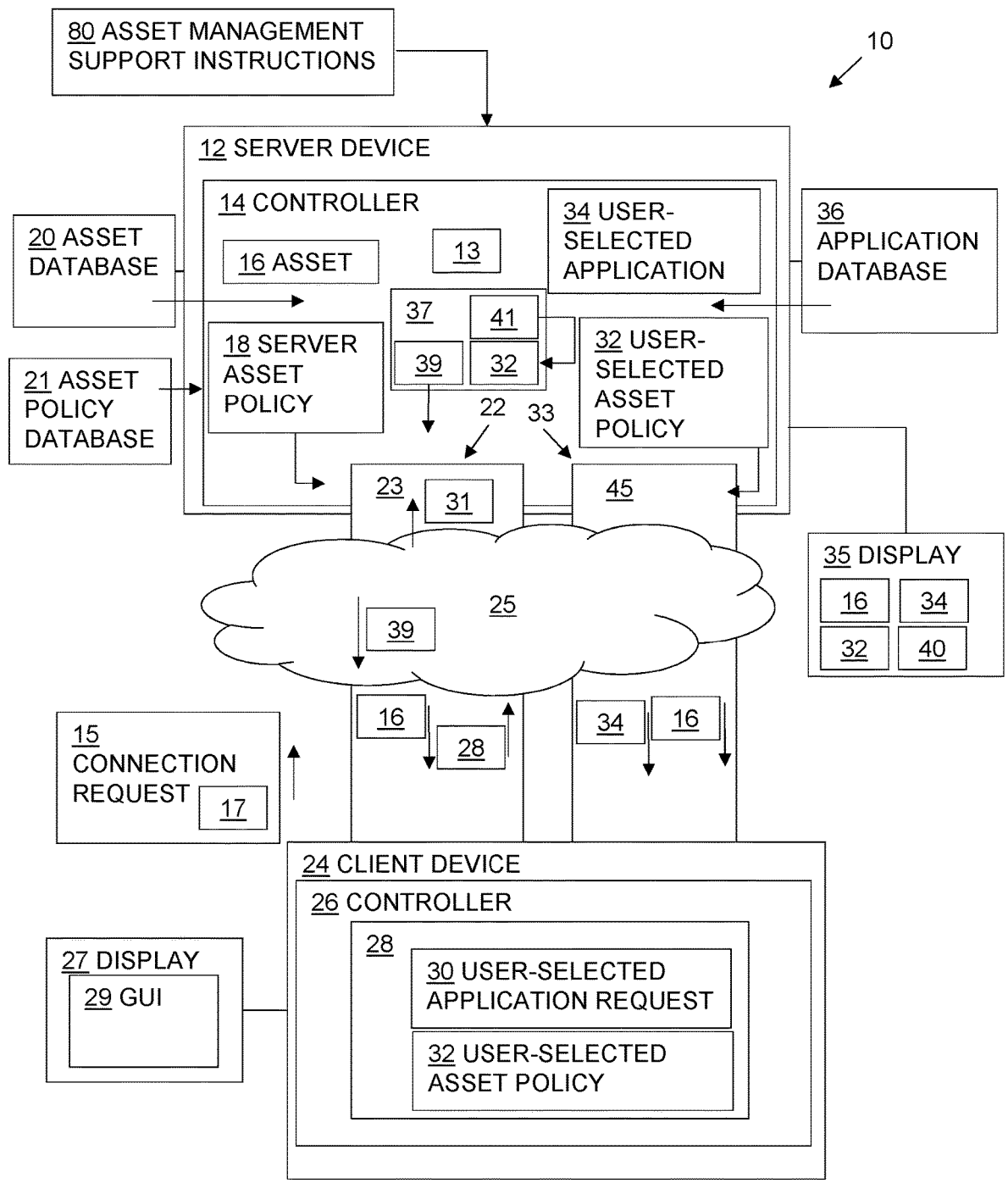
FIG. 1 illustrates a schematic representation of a network having a server device configured to provide isolated asset access to a client device, according to one arrangement.

FIG. 1 illustrates a block diagram of a computer network 10, according to one arrangement. The computer network 10 can be configured in a variety of ways. For example, the computer network 10 can be configured as a local area network (LAN), such as within an enterprise. In another example, the computer network 10 can be configured as a wide area network (WAN), such as across multiple enterprises (e.g., the Internet).

The computer network 10 includes a set of network devices, such as one or more client devices 24, disposed in electrical communication with a server device 12, through a network 25. In one arrangement, each client device 24 is configured as a computerized device, such as a laptop or personal computer, having a controller 26, such as a memory and a processor.

The server device 12 is configured as a computerized device including a controller 14, such as a memory and a processor, configured with a layered security application 13. When executed by the controller 14 of the server device 12, the layered security application 13 configures the server device 12 to instantiate a secure environment with the client device 24 which allows the client device 24 to manipulate assets 16 provided by the server device 12 while mitigating attacks, such as ransomware or data leaks.

Figure 2:
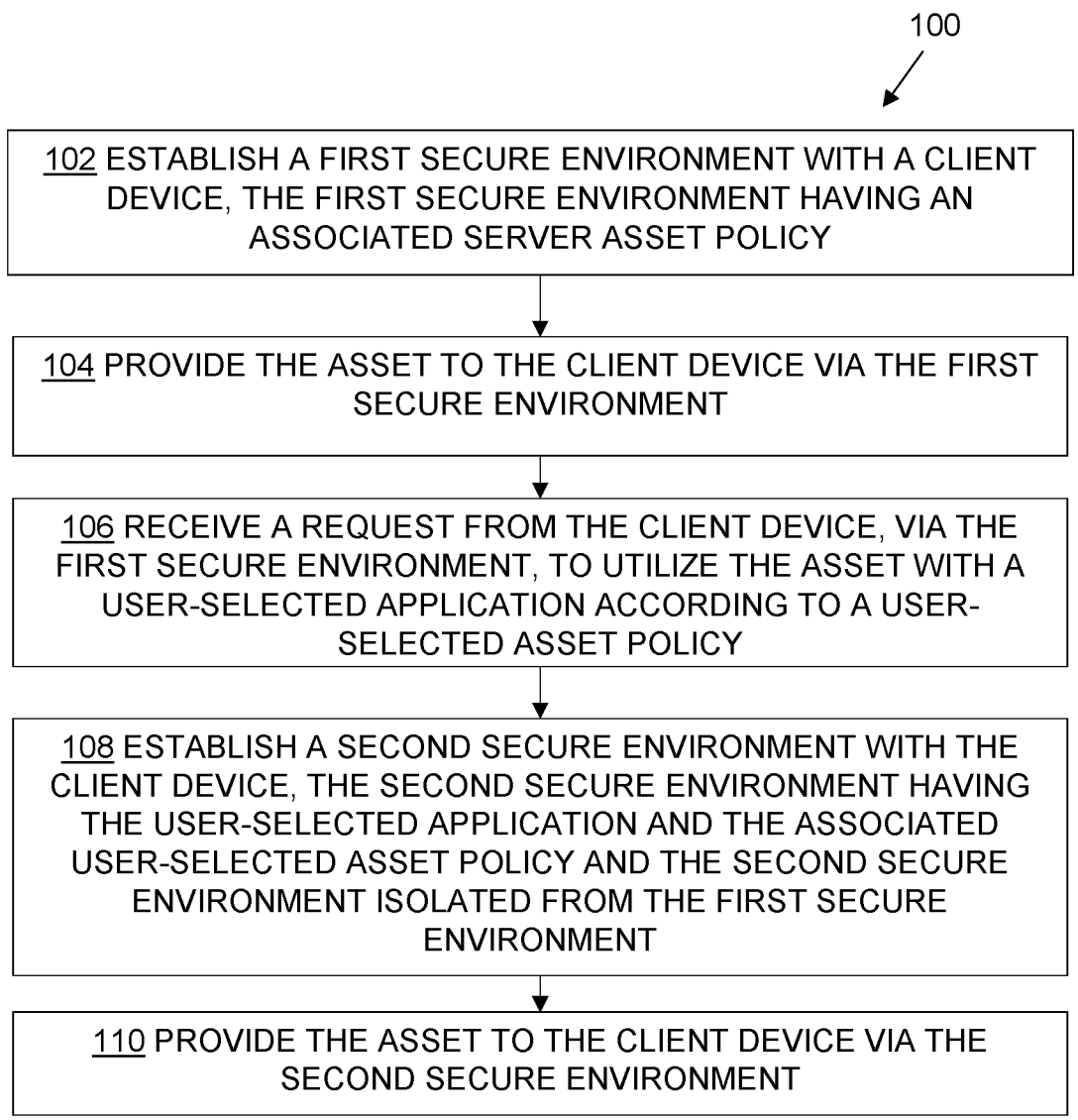
FIG. 2 illustrates a flowchart of a process performed by the server device of FIG. 1 when providing isolated access to an asset, according to one arrangement.

FIG. 2 illustrates a flowchart 100 of an example process performed by the server device 12 of the when providing isolated asset access to a client device 24.

In element 102, the server device 12 establishes a first secure environment 22 with a client device 24, the first secure environment 22 having an associated server asset policy 18.

In one arrangement, with reference to FIG. 1, the server device 12 is configured to provide assets 16 to client devices 24 in the network 10. For example, the server device 12 can be configured to provide classroom grade information to requesting client devices 24, such as operated by professors or teachers. In such an example, the server device 12 can provide the classroom grade information as the asset 16.

To initiate the process, a client device 24 transmits a connection request 15 to the server device 12 via network 25. The connection request 15 can be configured in a variety of ways. For example the connection request 15 can include client device identification information 17, such as a password or other information that identifies the client device 24 to the server device 12. When the server device 12 detects that the client device identification information 17 matches a set of permissions for the client device 24, the server device 12 can establish the first secure environment 22 with the client device 24.

The first secure environment 22 can be configured in a variety of ways. In one arrangement, the first secure environment 22 is configured as a first virtual machine 23 which defines a secure relationship between the client device 24 and the server device 12. Further the first virtual machine 23 functions as a distinct channel between the server device 12 and the client device 24, separate from any other additional virtual machines which the server device 12 establishes with other client devices in the computer network 10.

The first virtual machine 23 provides the technical control for the client device's interaction with the assets 16. For example, as provided above, the first secure environment 22 includes an associated server asset policy 18 which defines how the client device 24 can utilize the assets 16. In the case where the assets 16 are student grades for a particular class, the server asset policy 18 can limit the way in which the client device interacts with the grades. For example, the server asset policy 18 can allow the client device 24 to display student grades 16 for a given class, but to disallow any additional operations associated with the grades, such as statistical analysis or printing of the grades 16. In one arrangement, the server device can retrieve the server asset policy 18 from an asset policy database 21.

Returning to FIG. 2, in element 104, the server device 12 provides the asset 16 to the client device 24 via the first secure environment 22. For example, with reference to FIG. 1, following establishment of the first virtual machine 23, the client device 24 can transmit an asset request 31 to the server device 12 requesting a particular asset 16, such as student grades. In response to receiving the asset request 31, the server device 12 can access an asset database 20 to retrieve the asset 16 (e.g., a copy of the asset 16) requested by the client device 24. Once retrieved, the server device 12 is configured to transmit the asset 16 to the client device 24 via the first virtual machine 23. As provided above, the first virtual machine 23 allows the client device 24 to interact with the assets 16 in accordance with the associated server asset policy 18. As such, the client device 24 can be limited to the types of interactions the end-user can have with the assets.

Returning to FIG. 2, in element 106, the server device 12 receives a request 28 from the client device 24, via the first secure environment 22, to utilize the asset 16 with a user-selected application 30 according to a user-selected asset policy 32.

In one arrangement, with reference to FIG. 1, the end-user of the client device 24 can decide to manipulate the asset 16 outside of the scope of the server asset policy 18. For example, in the case of student grades, the end-user can decide to perform a statistical analysis on the grades for a particular class or for a group of classes taught by the end-user. However, in the present example, statistical analysis of the grades is not allowed as per the server asset policy 18 associated with the first secure environment 22. As such, the end-user can cause the client device 24 to generate a request 28 which identifies a user-selected asset policy 32, in this case a request to allow a statistical analysis to be performed on the student grades 16 received from the server device 12. In one arrangement, the first secure environment 22 can provide an end-user of the client device 24 with a graphical user interface (GUI) 29 via a display 27 that allows the end-user to identify changes to the server asset policy 18. For example, the GUI 29 can allow the end-user to identify "perform statistical analysis on grades" as a change to the server asset policy 18. Based upon this end-user input, the client device 24 can include these changes to the server asset policy 18 as the user-selected asset policy 32 within the request 28.

Further, the request 28 can include a user-selected application request 30 which identifies an application to be used by the client device 24 when executing the user-selected asset policy 32. For example, the GUI 29 can allow the end-user to identify EXCEL as the application to be used when performing the statistical analysis of the student grades. Based upon this end-user input, the client device 24 can include this selected application as the user-selected application request 30 within the request 28 and can transmit the request 28 to the server device 12 via the first secure environment 22 for further processing.

In one arrangement, with continued reference to FIG. 1, in response to receiving the request 28 the server device 12 is configured to review the user-selected asset policy 32 of the request and to generate an asset policy adjustment negotiation message 39 when the user-selected asset policy 32 exceeds an asset policy threshold 41. For example, the server device 12 can be configured with an asset policy review engine 37. In response to receiving the user-selected asset policy 32, the asset policy review engine 37 compares the user-selected asset policy 32 with the asset policy threshold 41, such as a list of asset policies which have been approved for use with a particular asset.

For example, assume the asset policy threshold 41 identifies "statistical analysis" as an asset policy which can be utilized by the client device 24 for the asset 16. Further assume the case where the client device 24 includes "statistical analysis" and "print grades" as part of the user-selected asset policy 32. In such a case, when the server device 12 receives the request 28, the asset policy review engine 37 can compare the user-selected asset policy 32 of "statistical analysis" and "print grades" with the asset policy threshold 41 which only includes "statistical analysis." Since the inclusion of "print grades" exceeds the asset policy threshold 41 (e.g., is not in the approved list of asset policies), the asset policy review engine 37 can generate the asset policy adjustment negotiation message 39 and transmit the message 39 to the client device 24.

The asset policy adjustment negotiation message 39 can be configured in a variety of ways. In one arrangement, the asset policy adjustment negotiation message 39 can include a notification that at least a portion of the user-selected asset policy 32 exceeds the approved asset policies associated with the asset 16. The asset policy adjustment negotiation message 39 can further request the client device 24 provide a revised user-selected asset policy 32. As such, the process of transmittal of a user-selected asset policy 32 by the client device 24 to the server device 12 and transmittal of an asset policy adjustment negotiation message 39 from the server device to the client device 24 can continue until both the server device 12 and the client device 24 agree upon the user-selected asset policy 32 to be utilized.

While the server device 12 can be configured to review the user-selected asset policy 32 generate the asset policy adjustment negotiation message 39 automatically, it is understood that a user or administrator of the server device 12 can review the user-selected asset policy 32 and, if needed, generate and transmit the asset policy adjustment negotiation message 39 to the client device 24 manually.

Returning to FIG. 2, in element 108, the server device 12 establishes a second secure environment 33 with the client device 24, the second secure environment 33 having the user-selected application 34 and the associated user-selected asset policy 32, the second secure environment 33 being isolated from the first secure environment 22.

In one arrangement, prior to establishing the second secure environment 33 and based upon the user-selected application request 30, the client device 12 is configure to retrieve a user-selected application 34 from an application database 36. The application database 36 can be configured to include any application which can be requested by the client device 24 for manipulation of the asset 16. For example, in the case where the user-selected application request 30 identifies EXCEL as the application to be used when performing the statistical analysis of the student grades, following review of the user-selected application request 30, the server device 12 is configured to retrieve the EXCEL application as the user-selected application 34 from an application database 36.

Following retrieval of the user-selected application 34, the server device 12 is configured to establish the second secure environment 33 with the client device 24.

The second secure environment 33 can be configured in a variety of ways. In one arrangement, the second secure environment 33 is configured as a second virtual machine 45 which defines a secure relationship between the client device 24 and the server device 12. Further the second secure environment 33 functions as a distinct channel between the server device 12 and the client device 24, separate from any other additional virtual machines which the server device 12 establishes with other client devices in the computer network 10.

The second virtual machine 45 provides the technical control for the client device's interaction with the asset 16. For example, as provided above, the second secure environment 33 includes the associated user-selected asset policy 32 which defines how the client device 24 can utilize the assets 16. For example, as provided above, the user-selected asset policy 32 can provide the client device 24 with broader or more liberal interaction with the asset 16 relative to the server asset policy 18. Further, the server device 12 can associate the user-selected application 34 with the second secure environment 33. For example, the server device 12 can configure the second virtual machine 45 to execute the user-selected application 34 according to the user-selected asset policy 32.

Returning to FIG. 2, in element 110, the server device 12 provides the asset 16 to the client device via the second secure environment 33. As indicated in FIG. 1, when the client device 24 manipulates the asset 16, such manipulation is limited to the use of the user-selected application 34 according to a relatively narrow user-selected asset policy 30 within second secure environment 33.

By executing the layered security application 13, the server device 12 can dynamically instantiate secure environments 22, 33, such as virtual machines 23, 45, on demand and can facilitate negotiation of a security policy for assets 16 with the client device 24 and can mitigate or eliminate any changes to the asset 16 stored by the asset database 20 during manipulation by the client device 24. As such, the server device 12 can maintain the integrity of the data or assets 16, thereby mitigating attacks, such as ransomware or data leaks.

As provided above, the server device 12 is configured to instantiate a secure environment with the client device 24 which allows the client device 24 to manipulate assets 16 provided by the server device 12 while mitigating attacks. In one arrangement, the server device 12 can be configured to utilize information pertaining to the client device's use of the asset 16 to develop or adjust server asset policies for other client devices within the computer network 10.

Figure 3:
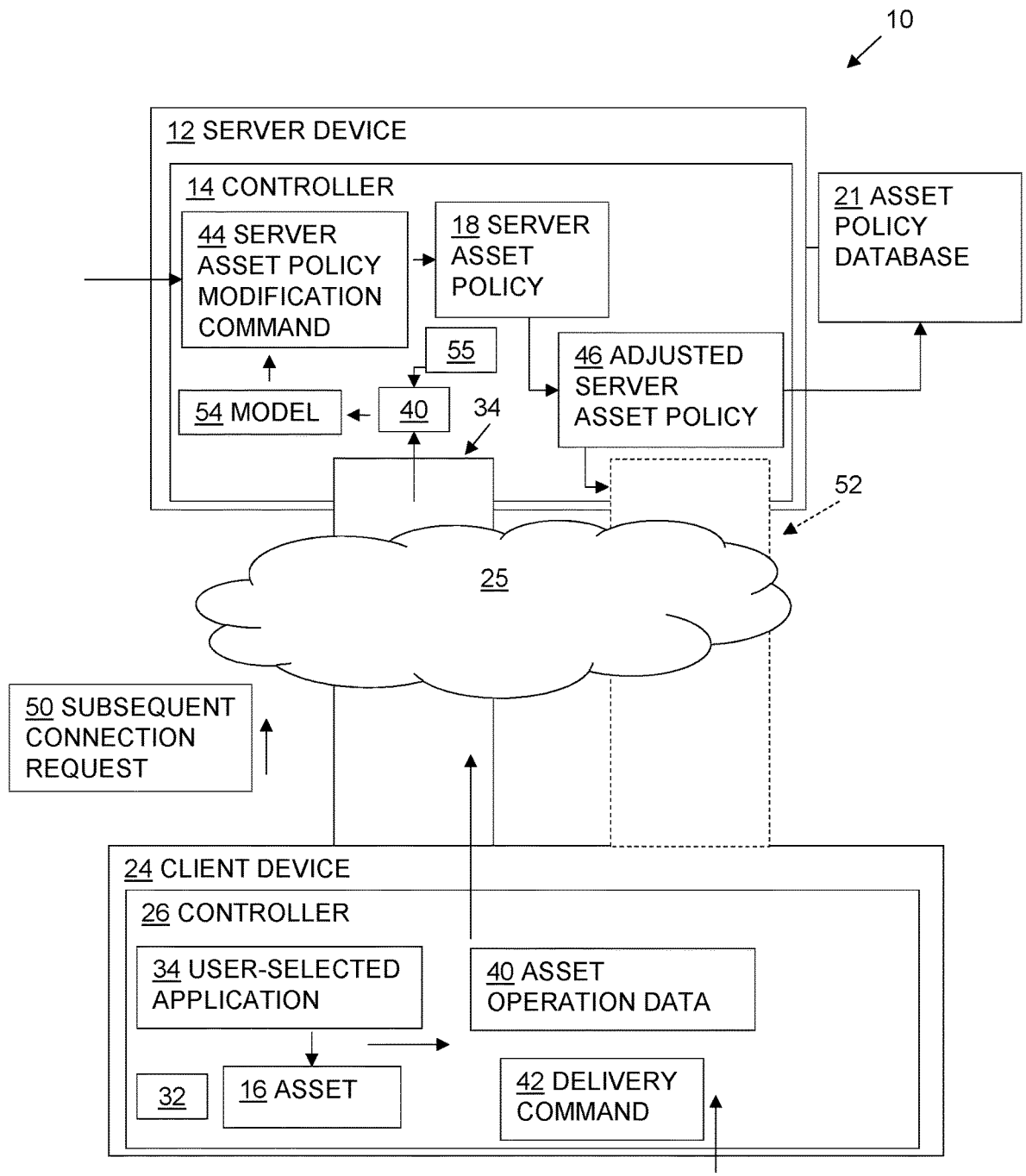
FIG. 3 illustrates a schematic representation of the network of FIG. 1, according to one arrangement.

For example, with reference to FIG. 3, during operation, the client device 24 can manipulate the asset 16 within a second secured environment 34 using the user-selected application 34 according to the user-selected asset policy 32. As the client device 24 manipulates the asset 16, the client device 24 can record and store events relating to the manipulation of the asset 16 as client device asset operation data 40. For example, in the case where the asset 16 is configured as student grades from a course and the client device 24 performs a statistical analysis (i.e., user-selected asset policy 32) of the grades using EXCEL (i.e., user-selected application 34), the client device 24 record and store each event in the manipulation of the student grades (e.g., calculate the average grade for the course, calculate the mean grade for the course, calculating the standard deviation of the grades in the course, etc.) as asset operation data 40. The client device 24 can then send the client device asset operation data 40 to the server device 12 for further analysis. For example, the client device 24 can automatically provide the client device asset operation data 40 to the server device 12 via the second secure environment 33 either on an ongoing basis or at the completion of the manipulation of the asset 16 using the user-selected application 34. Alternately, the client device 24 can provide the client device asset operation data 40 to the server device 12 via the second secure environment 33 following execution of a user-initiated delivery command 42, such as provided to the end-user via the GUI 29.

With receipt of the client device asset operation data 40 from the client device 24, a server device administrator can review the manipulation events recorded by the client device 24 to determine whether the use of the user selected application 34 according to the user-selected asset policy 32 affects the security of the asset 16 stored by the asset database 20. For example, the server device administrator can review each event contained within the client device asset operation data 40 and associated with the manipulation of the student grades to determine if the user-selected asset policy 32 affects the security of the asset 16. In the case where the server device administrator determines the user-selected asset policy 32 to have minimal, if any, effect on the security of the asset 16 stored by the asset database 20, based upon the review of the client device asset operation data 40, the server device administrator can manually provide the server device 12 with a server asset policy modification command 44.

Following receipt of the server asset policy modification command 44, the server device 12 can adjust the server asset policy 18 associated with the selected asset 16 and associated with the particular client device 24. For example, the server device 12 can modify the existing server asset policy 18 to allow the client device 24 to both display student grades 16 for a given class and to perform statistical analysis on the grades 16. Following the modification, the server device 12 can store the server asset policy 18 as an adjusted server asset policy 46 with the asset policy database 21. As such, the server asset policy modification command 44 allows the server device 12 to customize (i.e., broaden) a given server asset policy 18 to account for an end-user preference associated with a particular client device 24 and to maintain the integrity of the assets 16, such as stored by the asset database 20.

Accordingly, the server device 12 can utilize the adjusted server asset policy 46 for subsequent secure connections with the client device 24. For example, with continued reference to FIG. 3, the server device 12 can receive a request 50 from the client device 24 via the network 25 to establish a secure environment. In response to the request 50, the server device 12 can review the request for identification information relating to the client device 24. In the case where the server device 12 identifies the client device 24 as have established one or more previous secure environments with the server device 12, the server device 12 can retrieve the adjusted server asset policy 46 associated with that client device 24 for a particular asset 16. Further, the server device 12 can establish the subsequent secure environment 52 (e.g., virtual machine) with the client device 24 having the adjusted server asset policy 46 which defines how the client device 24 can utilize the asset 16 (e.g., allow the client device 24 to both display student grades 16 for a given class and to perform statistical analysis on the grades 16).

As provided above, a server device administrator can review the manipulation events recorded by the client device 24. In another example, with receipt of the client device asset operation data 40 from the client device 24, the server device 12 itself can review the manipulation events recorded by the client device 24 to determine whether the use of the user selected application 34 according to the user-selected asset policy 32 affects the security of the asset 16 stored by the asset database 20.

For example, the server device 12 can include an engine 55 which applies the asset operation data 40 to a trained server asset policy modification model 54. Based upon such application, the model 54 can generate a prediction (not shown) regarding the effect the user-selected asset policy 32 can have on the security of the asset 16. In the case where the server asset policy modification model 54 generates a prediction that the user-selected asset policy 32 has minimal, if any, effect on the security of the asset 16 stored by the asset database 20, the engine 55 can generate and provide the server device 12 with the server asset policy modification command 44.

As provided above, the server asset policy modification command 44 allows the server device 12 to customize (i.e., broaden) a given server asset policy 18 to account for an end-user preference associated with a particular client device 24. In one arrangement, the server asset policy modification command 44 allows the server device 12 to customize a given server asset policy 18 for a group of related client devices 24-1, 24-2, such as client devices belonging to a particular department of an organization associated with the computer network 10.

Figure 4:
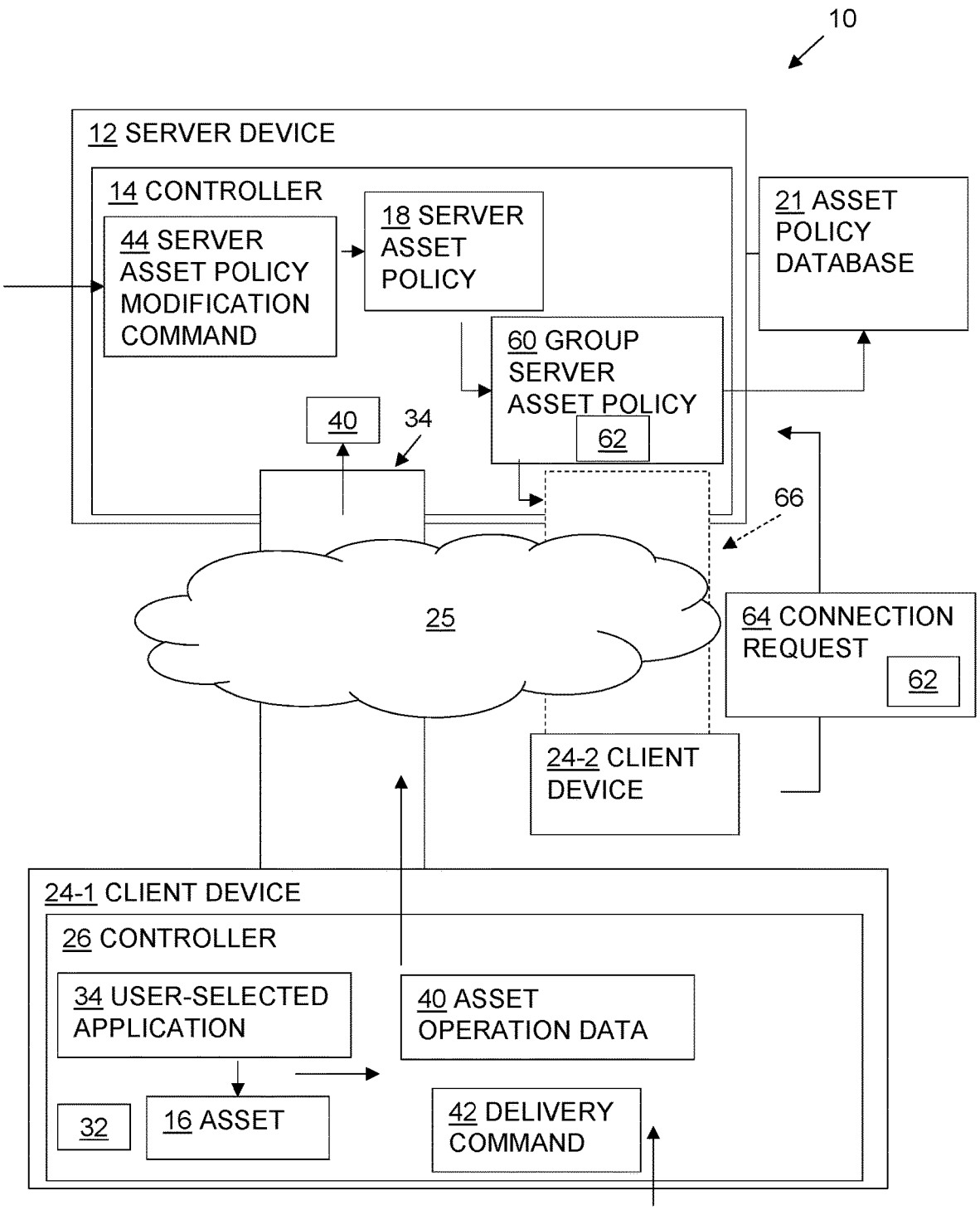
FIG. 4 illustrates a schematic representation of the network of FIG. 1, according to one arrangement.

With reference to FIG. 4, during operation, as the client device 24-1 manipulates the asset 16, the client device 24-1 can record and store events relating to the manipulation of the asset 16 as client device asset operation data 40 and provides the data 40 to the server device 12. With receipt of the client device asset operation data 40 from the client device 24-1, a server device administrator can review the manipulation events recorded by the client device 24-1 to determine whether the use of the user selected application 34 according to the user-selected asset policy 32 affects the security of the asset 16 stored by the asset database 20. In the case where the server device administrator determines the user-selected asset policy 32 to have minimal, if any, effect on the security of the asset 16 stored by the asset database 20, based upon the review of the client device asset operation data 40, the server device administrator can manually provide the server device 12 with a server asset policy modification command 44

Following receipt of the server asset policy modification command 44, the server device 12 can adjust the server asset policy 18 to generate a group server asset policy 60 for a group of client devices 24-1, 24-2 based upon the server asset policy modification command 44 where each group server asset policy 60 includes a client device grouping criterion 62. The server device 12 can updated the asset policy database with the group server asset policy 60.

In certain cases, a set client devices 24-1, 24-2 may need to access certain common assets 16 from the server device 12 using the same asset policies, even if those client devices 24-1, 24-2 are associated with different levels within the organization hierarchy. As such, the generation of a group server asset policy 60 allows each of the client devices 24-1, 24-2 to access the assets 16 using a secure, common policies 60. Accordingly, the server device 12 can utilize the group server asset policy 60 for subsequent secure connections with other client devices 24-2 within a given group on the network 10.

For example, with continued reference to FIG. 4, the server device 12 can receive a request 64 from the client device 24-2 via the network 25 to establish a secure environment. In response, the server device 12 can review the request 64 for client device grouping criterion 62. In the case where the server device 12 identifies the client device 24-2 as having a client device grouping criterion 62 that matches the client device grouping criterion 62 of a group server asset policy 60, the server device 12 can retrieve that group server asset policy 60 from the asset policy database 21. Further, the server device 12 can establish the secure environment 66 (e.g., virtual machine) with the client device 24-2 having the group server asset policy 60 which defines how the client device 24-2 can utilize an asset 16.

In certain cases, organizations may need to view and analyze information related to assets 16, policies 42, and user-selected applications 34 utilized by the computer network 10. For example, administrators or IT security officials can gain situational awareness of the operation of the computer network 10 based upon this information. In one arrangement, the server device 12 is configured to provide a visual overview and detail views on assets 16, applications 34, and user-selected policies.

For example, with reference to FIG. 1, the server device 12 is configured to log asset information 16, user-selected application information 34, user-selected asset policy information 32, and client device asset operation data information 40 for at least one client device 24 of the network 10. The server device 12 is configured to display the asset information 16, user-selected application information 34, user-selected asset policy information 32, and client device asset operation data information 40 on a display 35. The server device 12 can provide such display in an ongoing basis where the server device 12 continuously updates the information as received. Alternately, the server device 12 can provide such display based upon a particular time schedule (e.g., hourly, daily, etc.).

The server device 12 can provide the information to the display 35 in a variety of ways. For example, the server device 12 can provide risk mitigation visualizations that show tools or users that have access to an asset but rarely use it, and thus are candidates for pruning. The server device 12 can provide user-focused visualizations that can show workers who have accumulated substantial risk due to moving high-value assets out of protected zones. The server device 12 can provide software-focused visualizations that show applications that have disproportionate amount of access, enabling of officials to reason about malware risks. Based upon the visualizations of the information on the display 32, the administrators or IT security officials can provide the server device with asset management support instructions 80 which identify the risks as proposed solutions to the risks.

While various embodiments of the innovation have been particularly shown and described, it will be understood by those skilled in the art that various changes in form and details may be made therein without departing from the spirit and scope of the innovation as defined by the appended claims.

What is claimed is:

1. A method to provide isolated access to an asset by a server device, comprising:

establishing a first secure environment with a client device, the first secure environment having an associated server asset policy, the server asset policy defining at least one restriction on utilization of the asset by the client device;

providing the asset to the client device via the first secure environment;

receiving a request from the client device, via the first secure environment, to utilize the asset with a user-selected application according to a user-selected asset policy, the user-selected asset policy defining a change to the server asset policy, the user-selected asset policy selected by a user of the client device from changed server asset policies provided by the server device;

establishing a second secure environment with the client device, the second secure environment having the user-selected application and the associated user-selected asset policy and the second secure environment isolated from the first secure environment; and providing the asset to the client device via the second secure environment.

2. The method of claim 1, wherein the first secure environment comprises a first virtual machine and the second virtual environment comprises a second virtual machine.

3. The method of claim 1, wherein establishing the second secure environment with the client device further comprises retrieving the user-selected application from an application database.

4. The method of claim 1, further comprising receiving client device asset operation data via the second secure environment, the client device asset operation data associated with manipulation of the asset by the client device via the user-selected application.

5. The method of claim 4, wherein receiving client device asset operation data comprises receiving client device asset operation data via the second secure environment following execution of a user-initiated delivery command.

6. The method of claim 4, comprising:

receiving a server asset policy modification command based upon receipt of the client device asset operation data;

adjusting the server asset policy for the client device based upon the server asset policy modification command; and in response to receiving a request from the client device to establish a subsequent secure environment, establishing a subsequent secure environment with the client device, the subsequent secure environment having the adjusted server asset policy.

7. The method of claim 6, comprising:

applying the client device asset operation data to a server asset policy modification model;

in response to application of the client device asset operation data to the server asset policy modification model, generating the server asset policy modification command.

8. The method of claim 4, comprising:

receiving a server asset policy modification command based upon receipt of the client device asset operation data;

adjusting the server asset policy to generate a group server asset policy for a group of client devices based upon the server asset policy modification command, each group server asset policy having a client device grouping criterion; and in response to receiving a connection request from a client device of the group of client devices to establish a secure environment, the connection request having the client device grouping criterion, establishing a secure environment with the client device of the group of client devices, the secure environment having the group server asset policy matching the client device grouping criterion.

9. The method of claim 4, comprising:
logging asset information, user-selected application information, user- selected asset policy information, and client device asset operation data information for the client device;
displaying the asset information, user-selected application information, user-selected asset policy information, and client device asset operation data information; and
receiving asset management support instructions based upon the displayed information.

10. A server device, comprising:
a controller having a memory and a processor, the controller configured to:
establish a first secure environment with a client device, the first secure environment having an associated server asset policy, the server asset policy defining at least one restriction on utilization of the asset by the client device;
provide the asset to the client device via the first secure environment;
receive a request from the client device, via the first secure environment, to utilize the asset with a user-selected application according to a user-selected asset policy, the user-selected asset policy defining a change to the server asset policy, the user-selected asset policy selected by a user of the client device from changed server asset policies, as provided by the server device;
establish a second secure environment with the client device, the second secure environment having the user-selected application and the associated user-selected asset policy and the second secure environment isolated from the first secure environment; and
provide the asset to the client device via the second secure environment.

11. The server device of claim 10, wherein the first secure environment comprises a first virtual machine and the second virtual environment comprises a second virtual machine.

12. The server device of claim 10, wherein when establishing the second secure environment with the client device the controller is further configured to retrieve the user-selected application from an application database.

13. The server device of claim 10, wherein the controller is further configured to receive client device asset operation data via the second secure environment, the client device asset operation data associated with manipulation of the asset by the client device via the user-selected application.

14. The server device of claim 13, wherein when receiving client device asset operation data the controller is configured to receive client device asset operation data via the second secure environment following execution of a user-initiated delivery command.

15. The server device of claim 13, wherein the controller is configured to:
receive a server asset policy modification command based upon receipt of the client device asset operation data;
adjust the server asset policy for the client device based upon the server asset policy modification command; and in response to receiving a request from the client device to establish a subsequent secure environment, establish a subsequent secure environment with the client device, the subsequent secure environment having the adjusted server asset policy and the user-selected application.

16. The server device of claim 15, wherein the controller is configured to:
apply the client device asset operation data to a server asset policy modification model;
in response to application of the client device asset operation data to the server asset policy modification model, generate the server asset policy modification command.

17. The server device of claim 13, wherein the controller is configured to:
receive a server asset policy modification command based upon receipt of the client device asset operation data;
adjust the server asset policy to generate a group server asset policy for a group of client devices based upon the server asset policy modification command, each group server asset policy having a client device grouping criterion; and
in response to receiving a connection request from a client device of the group of client devices to establish a secure environment, the connection request having the client device grouping criterion, establish a secure environment with the client device of the group of client devices, the secure environment having the group server asset policy matching the client device grouping criterion.

18. The server device of claim 13, wherein the controller is configured to:
log asset information, user-selected application information, user-selected asset policy information, and client device asset operation data information for the client device;
display the asset information, user-selected application information, user- selected asset policy information, and client device asset operation data information; and
receive asset management support instructions based upon the displayed information.

19. A method to provide isolated access to an asset by a server device, comprising:
establishing a first secure environment with a client device, the first secure environment having an associated server asset policy, the server asset policy defining at least one restriction on utilization of the asset by the client device;
providing the asset to the client device via the first secure environment;
receiving a request from the client device, via the first secure environment, to utilize the asset with a user-selected application according to a user-selected asset policy, the user-selected asset policy defining a user-selected change to the server asset policy, the user-selected asset policy selected by a user from identified changes to the server asset policy provided by the server device;
establishing a second secure environment with the client device, the second secure environment having the user-selected application and the associated user-selected asset policy and the second secure environment isolated from the first secure environment; and
providing the asset to the client device via the second secure environment;

wherein receiving the request from the client device to utilize the asset with a user-selected application according to the user-selected asset policy comprises:

comparing the user-selected asset policy with an asset policy threshold;

in response to detecting the user-selected asset policy as exceeding the asset policy threshold, generating an asset policy adjustment negotiation message; and forwarding the asset policy adjustment negotiation message to the client device.

20. A server device, comprising:

a controller having a memory and a processor, the controller configured to:

establish a first secure environment with a client device, the first secure environment having an associated server asset policy, the server asset policy defining at least one restriction on utilization of the asset by the client device;

provide the asset to the client device via the first secure environment;

receive a request from the client device, via the first secure environment, to utilize the asset with a user-selected application according to a user-selected asset policy, the user-selected asset policy defining a user-selected change to the server asset policy, the user-selected asset policy selected by a user from identified changes to the server asset policy provided by the server device;

establish a second secure environment with the client device, the second secure environment having the user-selected application and the associated user-selected asset policy and the second secure environment isolated from the first secure environment; and provide the asset to the client device via the second secure environment;

wherein when receiving the request from the client device to utilize the asset with a user-selected application according to the user-selected asset policy, the controller is configured to:

compare the user-selected asset policy with an asset policy threshold;

in response to detecting the user-selected asset policy as exceeding the asset policy threshold, generate an asset policy adjustment negotiation message;

and forward the asset policy adjustment negotiation message to the client device.

* * * * *